(12) United States Patent
Schneider

(10) Patent No.: US 8,171,109 B2
(45) Date of Patent: May 1, 2012

(54) MOBILE BOOKMARKS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 302 days.

(21) Appl. No.: 11/809,226

(22) Filed: May 30, 2007

(65) Prior Publication Data

US 2008/0301222 A1 Dec. 4, 2008

(51) Int. Cl.
G06F 15/16 (2006.01)
(52) U.S. Cl. .......................... 709/218; 709/216
(58) Field of Classification Search .................. 709/218, 709/216
See application file for complete search history.

(56) References Cited

U.S. PATENT DOCUMENTS

| | | | | |
|---|---|---|---|---|
| 6,065,120 A * | 5/2000 | Laursen et al. | .................... | 726/5 |
| 2003/0009521 A1* | 1/2003 | Cragun | .......................... | 709/205 |
| 2004/0030741 A1* | 2/2004 | Wolton et al. | ................. | 709/202 |
| 2004/0139178 A1* | 7/2004 | Mendez et al. | ................ | 709/220 |
| 2005/0131866 A1* | 6/2005 | Badros et al. | ...................... | 707/3 |
| 2006/0224967 A1* | 10/2006 | Marmaros | ..................... | 715/738 |
| 2006/0236325 A1* | 10/2006 | Rao et al. | ........................ | 719/315 |
| 2007/0083535 A1* | 4/2007 | Zilliacus et al. | .............. | 707/101 |
| 2007/0088820 A1* | 4/2007 | Kwak et al. | ................... | 709/224 |
| 2007/0136305 A1* | 6/2007 | Kelley et al. | ..................... | 707/10 |
| 2007/0255854 A1* | 11/2007 | Khosravy et al. | ............. | 709/248 |
| 2008/0098039 A1* | 4/2008 | Kruis et al. | .................... | 707/201 |

FOREIGN PATENT DOCUMENTS

JP 2008059301 A * 3/2008
KR 20020042381 * 6/2002

* cited by examiner

*Primary Examiner* — Jude Jean Gilles
*Assistant Examiner* — Jaren M Means
(74) *Attorney, Agent, or Firm* — Lowenstein Sandler PC

(57) ABSTRACT

A method and apparatus for updating bookmarks is described. In one embodiment, a server has a bookmark database and a bookmark synchronizer. The bookmark synchronizer is configured to receive a communication from a web browser of a client of a user, to collect a list of bookmarks of the web browser of the client, to compare the list of bookmarks with a list of bookmarks stored in the server, and to synchronize the list of bookmarks of the web browser of the client with the list of bookmarks stored in the server.

20 Claims, 5 Drawing Sheets

MOBILE BOOKMARKS

TECHNICAL FIELD

Embodiments of the present invention relate to transferring mobile bookmarks, and more particularly, to synchronizing mobile bookmarks between web browsers of different clients.

BACKGROUND

A web browser is an application program that provides a way to look at and interact with information on the Internet. A web browser typically uses the Hypertext Transfer Protocol (HTTP) to make requests of web servers throughout the Internet on behalf of the browser user. Known web browsers include, for example, Microsoft® Internet Explorer (IE), Netscape® Navigator, Opera browser, Firefox browser and Lynx browser.

Each web browser is associated with a set of browser data that includes, for example, bookmarks, security settings, general settings, links to pages visited by a user, a home page, cookie settings, user interface (UI) elements (e.g., toolbar positions and visibility), etc. A user may access the internet from the same or different web browsers on different computers. For example, the user may access the internet with a web browser installed on his work computer at his workplace or with another web browser installed on his personal computer at home.

Currently, the user has to save the same bookmarks on his work and personal computer if he/she would like to have access to them from either location. To do so, the user has to manually transfer his bookmarks from one computer to another on a periodic basis. As such, a need exists for a method or system that helps overcome one or more of the above-described limitations.

BRIEF DESCRIPTION OF THE DRAWINGS

The present invention is illustrated by way of example, and not by way of limitation, in the figures of the accompanying drawings and in which.

DETAILED DESCRIPTION

Figure 1:
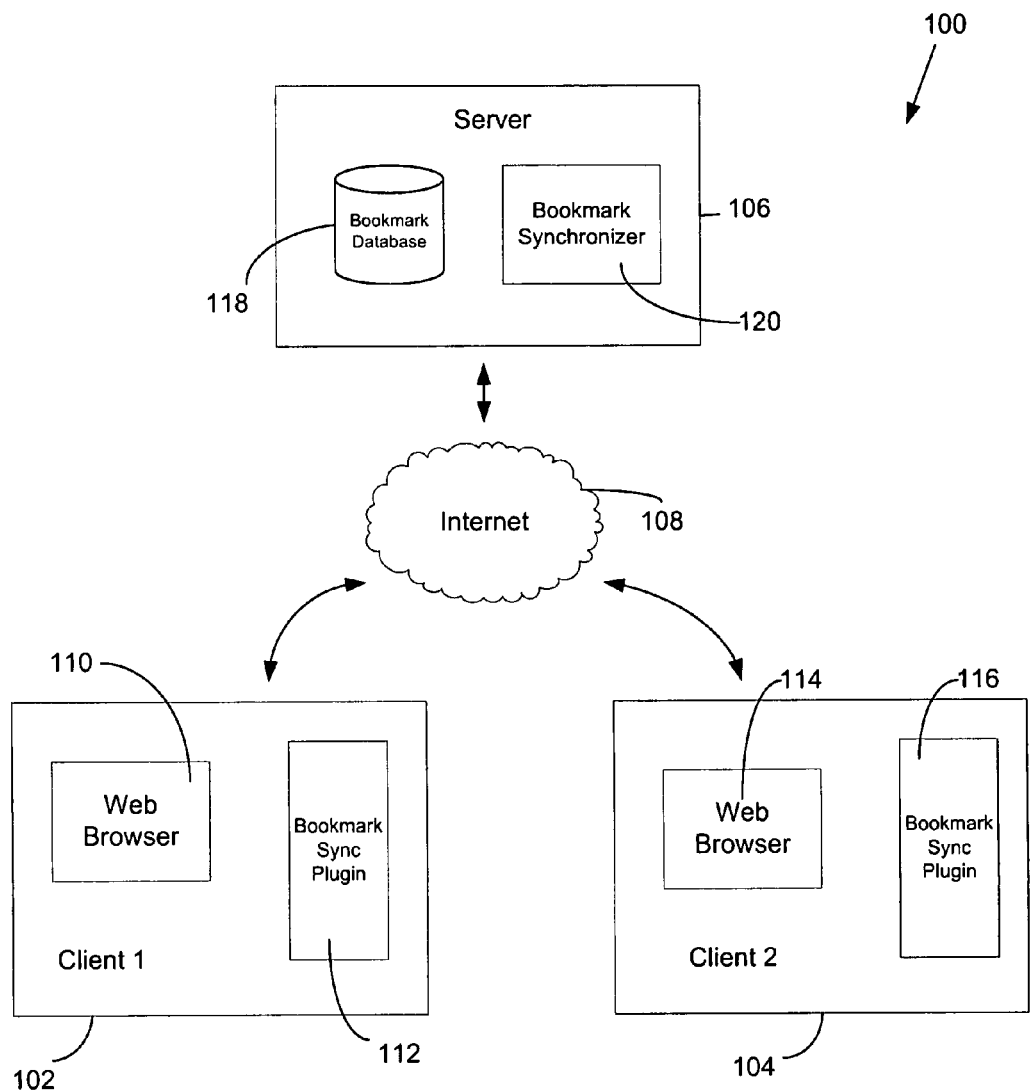
FIG. 1 illustrates a system architecture in which embodiments of the present invention may be implemented.

Described herein is a method and apparatus for updating bookmarks. A server receives a communication from a web browser of a client of a user. A list of bookmarks of the web browser of the client is collected. The list of bookmarks is compared with a list of bookmarks stored in the server. The list of bookmarks of the web browser of the client is synchronized with the list of bookmarks stored in the server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

System Architecture

FIG. 1 illustrates a system architecture 100 in which one embodiment of the present invention may be implemented. The system architecture 100 comprises client devices 102, 104, a network (e.g. Internet) 108, and a server 106. The client devices 102 and 104 may be personal computers (PCs), wireless telephones, palm-sized computing devices, personal digital assistants (PDAs), consumer electronic devices, etc. The client devices 102 and 104 are coupled to the server 106 via the network 108, which may be a public network (e.g., Internet) or a private network (e.g., Ethernet or a local area Network (LAN)).

Client devices 102 and 104 may be located at different locations or at a same location. For example, client device 102 may be located at a work place and client device 104 may be located at a home of a user of the client device 102. Client devices 102 and 104 may include host web browsers 110 and 114 respectively. Web browsers 110 and 114 may be of the same type (e.g., the IE browser) or of different types (e.g., the IE browser and the Firefox browser). Client devices 102 and 104 also include bookmark synchronizer plug-ins 112 and 116 respectively. In one embodiment, bookmark synchronizer plug-ins 112 and 116 may be a plug-in application or module for the corresponding web browser 110 or 114.

The bookmark synchronizer plug-ins 112 and 116 communicate with the server 106. In one embodiment, both plug-ins 112 and 116 communicate with the server 106 using the same network protocol (e.g., hypertext transfer protocol (HTTP). Alternatively, the plug-ins 112 and 116 communicate with the server 106 using different network protocols (e.g., HTTP and file transfer protocol (FTP)).

Server 106 may include a bookmark database 118 and a bookmark synchronizer 120. Bookmark database 118 may store a list of web bookmarks as selected by a user of the web browser 110 or as imported from a list of bookmarks stored in the web browser 110. In one embodiment, the bookmarks of web browsers 110, 114, and the database 118 are synchronized to store the same latest updated list of websites.

In one embodiment, a user of client device 102 launches web browser 110 or 114 to access the Internet. Upon the launch of the web browser 110, 114, the corresponding plug-in module 112 communicates with server 106 to synchronize the bookmarks. For example, the list of bookmarks from web browser 110 is compared with the list of bookmarks from bookmark database 118 of server 106. A synchronization may be performed after the comparison to reflect the latest version of the bookmarks. Such synchronization may include adding or deleting one or more bookmarks to the list of bookmarks in the web browser 110, 114 and/or in the bookmark database 118. As such, the user of device 102 is able to retrieve the same list of bookmark stored in his web browser on device 102 by starting his web browser 114 on device 104 and vice-versa.

In accordance with another embodiment, should the device 102 or 104 be off-line (i.e. Not communicating with network 108), web browser 102 may still contain a recent version of the list of bookmarks stored in the web browser 102 in contrast to bookmarks from some toolbar applications. These toolbar applications require a user to be online in order for him to access his list of bookmarks. Upon establishing a communication with network 108, bookmark synchronizer plug-in reattempts to communicate with server 106.

Figure 2:
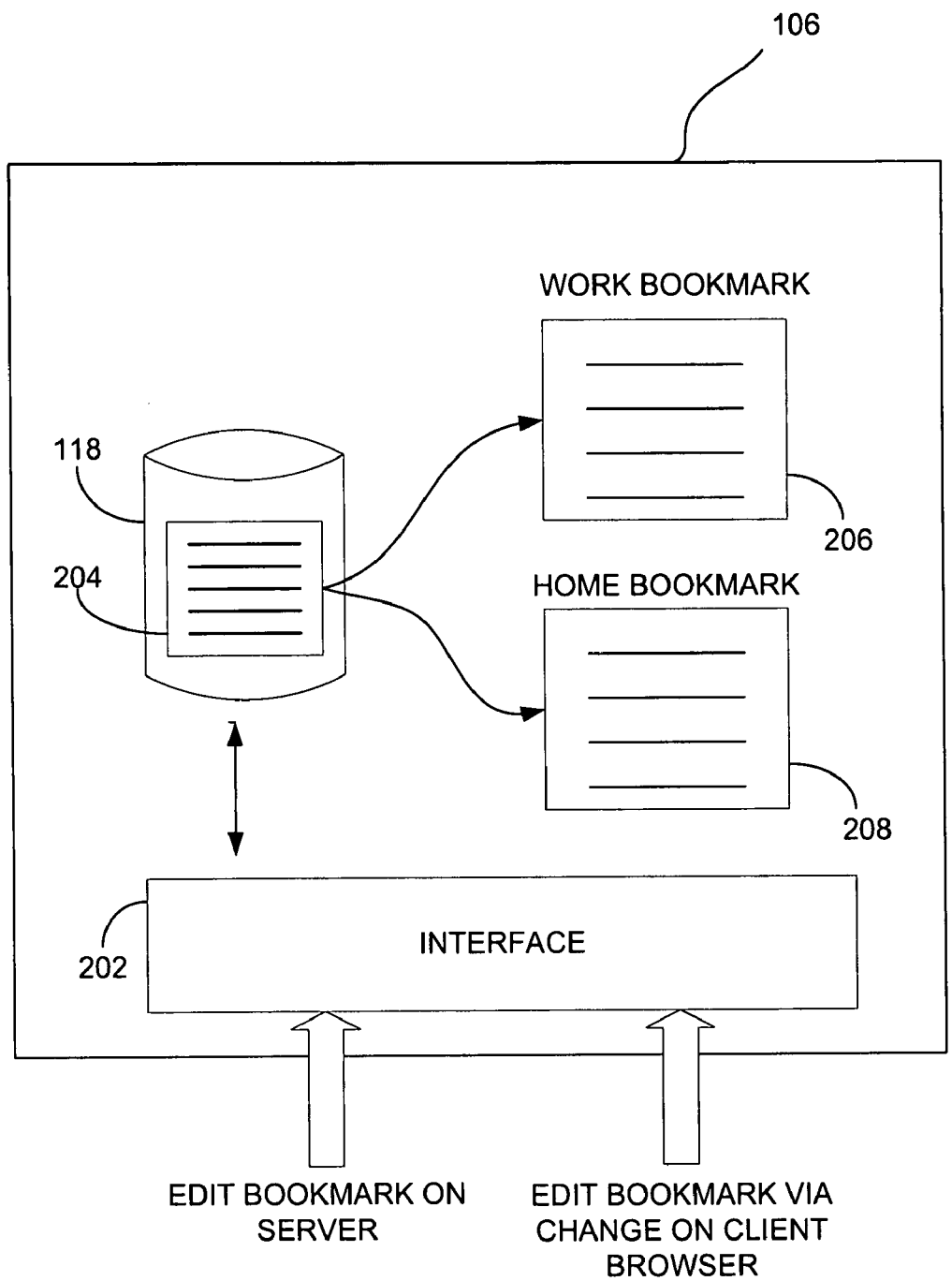
FIG. 2 illustrates a block diagram of one embodiment of a server.

FIG. 2 illustrates a block diagram of one embodiment of a server. The bookmark synchronizer 120 of server 106 communicates via interface 202 with the web browsers 110, 114 to synchronize the bookmarks. Server 106 may be accessed via web browser 110, 114.

In one embodiment, server 106 may be configured to allow the user of device 102, 104 to edit his corresponding list of bookmarks stored in bookmark database 118. Upon finishing the edit on the server 106, bookmark synchronizer 120 may communicate the update to web browsers 110, 114 via interface 202. In another embodiment, bookmark database 118 may be updated by performing a synchronization with web browsers 110, 114 via interface 202.

In one embodiment, bookmark database 118 may include a list of bookmarks 204 of the user from device 102, 104. In another embodiment, bookmark database 118 may be partitioned into several sublists 206, 208. Each sublist may be associated with a corresponding device and/or web browser. For example, a user may wish to only access certain websites (e.g. work related web sites) from bookmark sublist 206 on his web browser 110 on his device 102 at work. He may also wish to access other websites (e.g. bank websites, personal websites) from his bookmark sublist 208 on his web browser 114 on his device 104 at home. Similarly, the bookmarks stored on his browser 110, 114 are synchronized with his respective bookmark sublist 206, 208 stored in the server 106.

Figure 3:
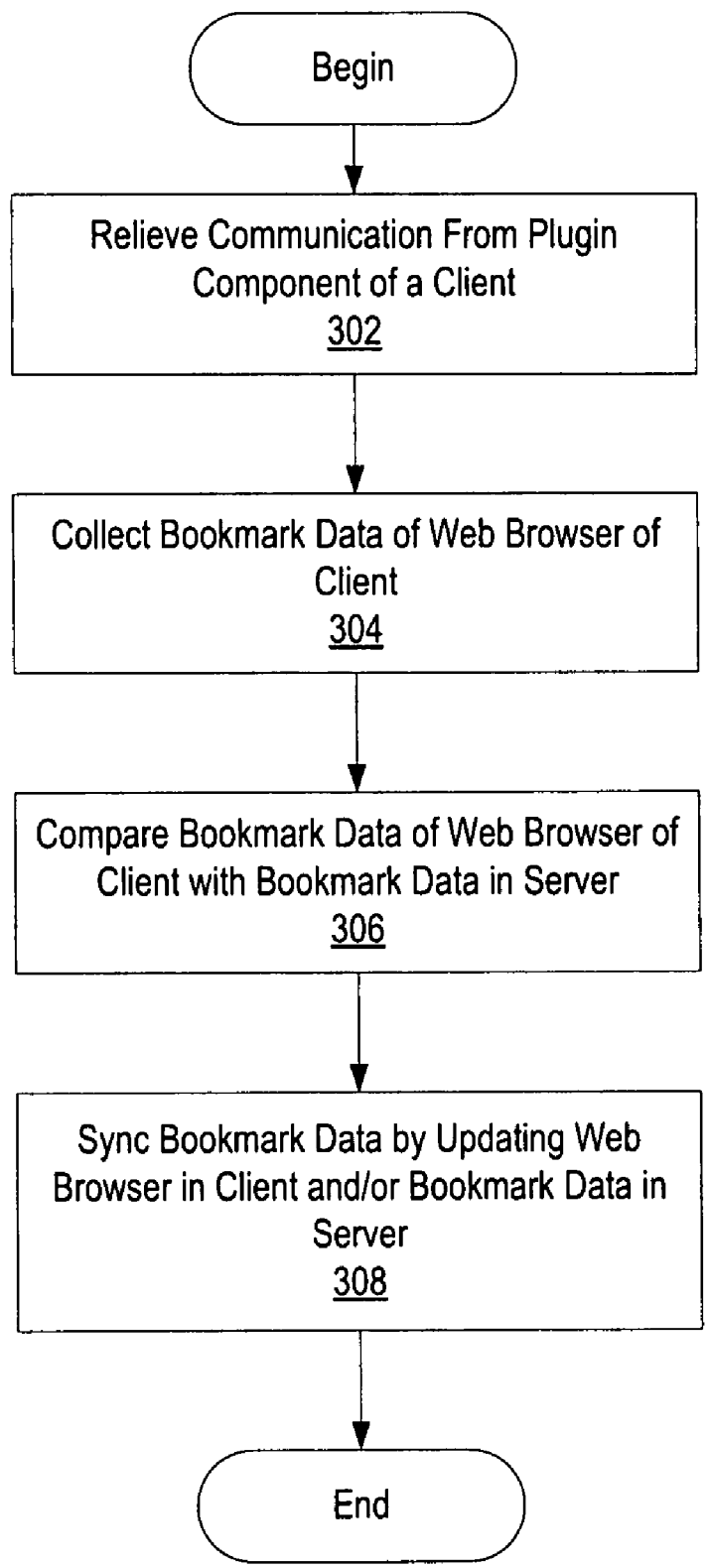
FIG. 3 illustrates a flow diagram of one embodiment of a method for updating bookmarks between browsers on different computers.

FIG. 3 illustrates a flow diagram of one embodiment of a method for updating bookmarks between browsers on different computers on a server. At 302, the server receives a communication from a web browser of a client of a user. At 304, the server collects a list of bookmarks stored in the web browser of the client device. At 306, the list of bookmarks stored in the web browser of the client device is compared with a list of bookmarks stored in the server. At 308, the list of bookmarks of the web browser of the client is synchronized with the list of bookmarks stored in the server.

The web browser of the client may automatically communicates with the server upon a launch of the web browser at the client device. In another embodiment, the server authenticates the user of the client device with the server. The server may also receive a communication from a web browser of another client device of the user. The server then collects a list of bookmarks of the web browser of the other client device and compares it with the list of bookmarks stored in the server. The list of bookmarks of the web browser of the other client device is synchronized with the list of bookmarks stored in the server.

In another embodiment, the list of bookmarks can be edited on the server by the user of the client.

Figure 4:
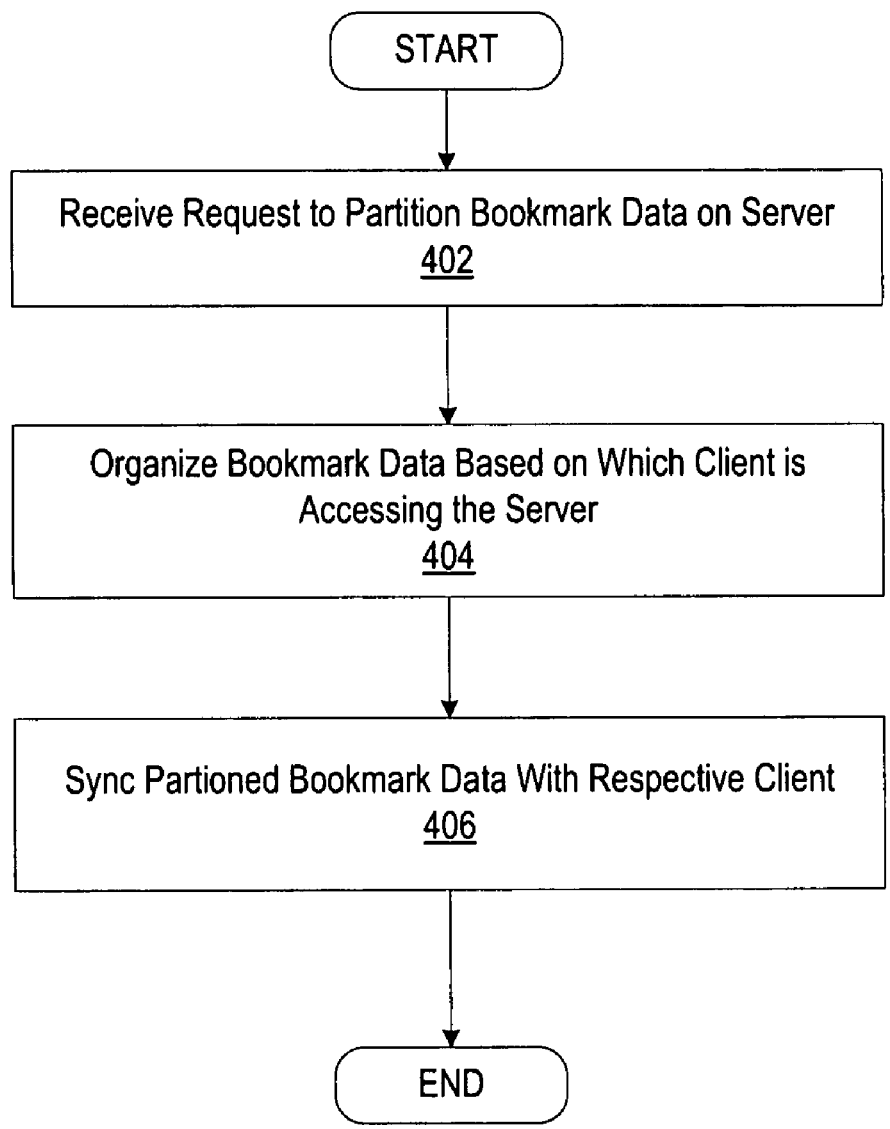
FIG. 4 illustrates a flow diagram of one embodiment of a method of partitioning bookmark data on a server.

FIG. 4 illustrates a flow diagram of one embodiment of a method of partitioning bookmark data on a server. At 402, the server receives a request to partition the bookmark data on the server. At 404, the server organizes the bookmark data based on which client device is accessing the server. At 406, the bookmark data is synchronized with the respective clients. The list of bookmarks stored in the server may be partitioned so that the partitioned list of bookmarks comprises one or more sublists of bookmarks. Each bookmark sublist may be only associated and may be accessed only with a corresponding client of the user.

Computer System

Figure 5:
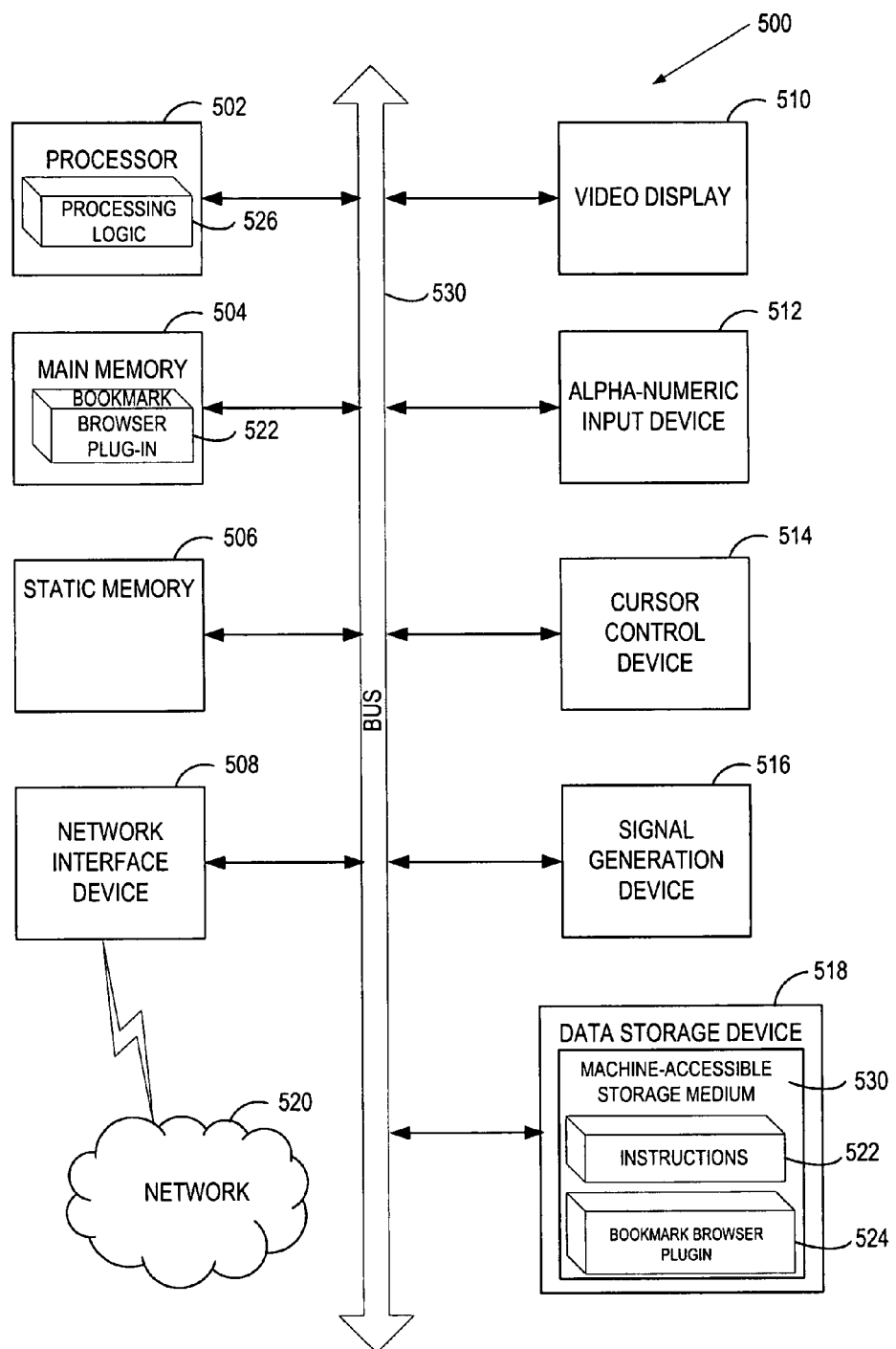
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the bookmark plug-in 524. The bookmark plug-in 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for updating bookmarks has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for updating bookmarks, the method comprising:

receiving a communication at a server from a first web browser of a first client of a user to synchronize a local list of bookmarks of the first web browser with a remote list of bookmarks stored in a bookmark database associated with the server, wherein the local list is associated with the first client, and wherein the first web browser of the first client automatically sends the communication to the server to synchronize the local list of bookmarks with the remote list of bookmarks upon a launch of the first web browser at the first client; and upon receiving the communication to synchronize the local list of bookmarks with the remote list of bookmarks, automatically checking whether the local list of bookmarks and the remote list of bookmarks are synchronized, wherein said automatically checking comprises:

collecting the local list of bookmarks from the first web browser; and comparing the local list of bookmarks from the first web browser with the remote list of bookmarks associated with the first client stored in the bookmark database; and when the local list of bookmarks and the remote list of bookmarks are not synchronized, synchronizing the local list of bookmarks from the first web browser with the remote list of bookmarks associated with the first client stored in the bookmark database, wherein said synchronizing comprises adding or deleting one or more bookmarks to or from at least one of the local list of bookmarks or the remote list of bookmarks to reflect the latest version of bookmarks, wherein the local list of bookmarks of the first web browser is accessible by the user of the first client while the first client is off-line, and wherein synchronizing further comprises synchronizing the local list of bookmarks of the web browser of the client with a corresponding one of a plurality of sublists of bookmarks stored in the bookmark database, each of the plurality of sublists associated with at least one of a corresponding one of a plurality of web browsers of the same user or a corresponding client of the same user.

2. The method of claim 1 further comprising authenticating the user of the first client with the server.

3. A computer-implemented method for updating bookmarks, the method comprising:

receiving a communication at a server from a first web browser to synchronize a local list of bookmarks of the first web browser with a remote list of bookmarks stored in a bookmark database associated with the server, wherein the local list is associated with a user of the first web browser;

collecting the local list of bookmarks from the first web browser;

comparing the local list of bookmarks from the first web browser with the remote list of bookmarks stored in the bookmark database; and synchronizing the local list of bookmarks from the first web browser with the remote list of bookmarks associated with the first web browser stored in the bookmark database, wherein said synchronizing comprises adding or deleting one or more bookmarks to or from at least one of the local list of bookmarks or the remote list of bookmarks to reflect the latest version of bookmarks;

receiving a communication from a second web browser to synchronize a local list of bookmarks of the second web browser with the remote list of bookmarks stored in the bookmark database, wherein the local list from the second web browser is associated with the same user of the first web browser, and wherein the second web browser is a different type than the first web browser;

collecting the local list of bookmarks from the second web browser;

comparing the local list of bookmarks from the second web browser with the remote list of bookmarks stored in the bookmark database; and synchronizing the local list of bookmarks from the second web browser with the remote list of bookmarks stored in the bookmark database, wherein said synchronizing comprises adding or deleting one or more bookmarks to or from at least one of the local list of bookmarks from the second web browser or the remote list of bookmarks to reflect the latest version of bookmarks, wherein the synchronized local list of bookmarks of the second web browser is a different list as the local list of bookmarks of the first web browser, wherein the communication received from the first web browser uses a first network protocol and the communication received from the second web browser uses a second network protocol, and wherein the first network protocol and the second network protocols are different network protocols.

4. The method of claim 1 further comprising configuring the remote list of bookmarks stored in the bookmark database to be editable by the user via the server.

5. A computer-implemented method for updating bookmarks, the method comprising:
receiving communications at a server from a plurality of web browsers associated with a same user, wherein at least two of the plurality of web browsers are different types of web browsers, and wherein the at least two of the plurality of web browsers communicate with the server using different network protocols;

collecting local lists of bookmarks from the plurality of web browsers;

comparing the local lists of bookmarks with a remote list of bookmarks stored in a bookmark database associated with the server;

synchronizing the local lists of bookmarks with the remote list of bookmarks, wherein at least two of the synchronized local lists of bookmarks of the plurality of web browsers are different lists, wherein said synchronizing comprises adding or deleting one or more bookmarks to or from at least one of the local lists of bookmarks or the remote list of bookmarks to reflect the latest version of bookmarks; and partitioning the remote list of bookmarks stored in the bookmark database, wherein the partitioned list of bookmarks comprises a plurality of sublists of bookmarks, each of the plurality of sublists associated with a corresponding one of the plurality of web browsers of the same user.

6. A computer-implemented method for updating bookmarks, the method comprising:

automatically communicating with a server upon a launch of a web browser of a client of a user to synchronize a local list of bookmarks of the web browser with a remote list of bookmarks stored in a bookmark database associated with the server, wherein the local list is associated with the client, wherein said automatically communicating comprises sending a request to the server to retrieve the remote list of bookmarks upon the launch of the web browser;

receiving the remote list of bookmarks stored in the bookmark database from the server in response to the request;

upon launch of the web browser, automatically checking whether the local list of bookmarks and the remote list of bookmarks are synchronized, wherein said automatically checking comprises comparing the local list of bookmarks of the web browser with the remote list of bookmarks associated with the client stored in the bookmark database; and when the local list of bookmarks and the remote list of bookmarks are not synchronized, synchronizing the local list of bookmarks from the web browser with the remote list of bookmarks associated with the client stored in the bookmark database, wherein said synchronizing comprises adding or deleting one or more bookmarks to or from at least one of the local list of bookmarks or the remote list of bookmarks to reflect the latest version of bookmarks, wherein the local list of bookmarks of the web browser is accessible by the user of the client while the client is off-line, wherein synchronizing further comprises synchronizing the local list of bookmarks of the web browser of the client with a corresponding one of a plurality of sublists of bookmarks stored in the bookmark database, each of the plurality of sublists associated with at least one of a corresponding one of a plurality of web browsers of the same user or a corresponding client of the same user.

7. The method of claim 6 further comprising authenticating the user of the client with the server.

8. The method of claim 6 further comprising accessing the server to edit the remote list of bookmarks stored in the bookmark database.

9. A non-transitory computer-readable storage medium, having instructions stored therein, which when executed, cause a server computer system to perform a method comprising:

receiving a communication at the server computer system from a first web browser of a first client of a user to synchronize a local list of bookmarks of the first web browser with a remote list of bookmarks stored in a bookmark database associated with the server computer system, wherein the local list is associated with the first client, and wherein the first web browser of the first client automatically sends the communication to the server to synchronize the local list of bookmarks with the remote list of bookmarks upon a launch of the first web browser at the first client; and upon receiving the communication to synchronize the local list of bookmarks with the remote list of bookmarks, automatically checking whether the local list of bookmarks and the remote list of bookmarks are synchronized, wherein said automatically checking comprises:
collecting the local list of bookmarks from the first web browser; and
comparing the local list of bookmarks from the first web browser with the remote list of bookmarks associated with the first client stored the bookmark database; and when the local list of bookmarks and the remote list of bookmarks are not synchronized, synchronizing the local list of bookmarks from the first web browser with the remote list of bookmarks associated with the first client stored in the bookmark database, wherein said synchronizing comprises adding or deleting one or more bookmarks to or from at least one of the local list of bookmarks or the remote list of bookmarks to reflect the latest version of bookmarks, wherein the local list of bookmarks of the first web browser is accessible by the user while the first client is off-line, and wherein synchronizing further comprises synchronizing the local list of bookmarks of the web browser of the client with a corresponding one of a plurality of sublists of bookmarks stored in the bookmark database, each of the plurality of sublists associated with at least one of a corresponding one of a plurality of web browsers of the same user or a corresponding client of the same user.

10. The computer-readable storage medium of claim 9 wherein the method further comprises authenticating the user of the first client with the server computer system.

11. A non-transitory computer-readable storage medium, having instructions stored therein, which when executed, cause a server computer system to perform a method comprising:
receiving a communication at the server computer system from a first web browser to synchronize a local list of bookmarks of the first web browser with a remote list of bookmarks stored in a bookmark database associated with the server computer system, wherein the local list is associated with a user of the first web browser;
collecting the local list of bookmarks from the first web browser;
comparing the local list of bookmarks from the first web browser with the remote list of bookmarks stored in the bookmark database; and
synchronizing the local list of bookmarks from the first web browser with the remote list of bookmarks associated with the first web browser stored in the bookmark database, wherein said synchronizing comprises adding or deleting one or more bookmarks to or from at least one of the local list of bookmarks or the remote list of bookmarks to reflect the latest version of bookmarks;
receiving a communication from a second web browser to synchronize a local list of bookmarks of the second web browser with the remote list of bookmarks stored in the bookmark database, wherein the local list from the second web browser is associated with the same user of the first web browser, and wherein the second web browser is a different type than the first web browser;
collecting the local list of bookmarks from the second web browser;
comparing the local list of bookmarks from the second web browser with the remote list of bookmarks stored in the bookmark database; and
synchronizing the local list of bookmarks from the second web browser with the remote list of bookmarks stored in the bookmark database, wherein said synchronizing comprises adding or deleting one or more bookmarks to or from at least one of the local list of bookmarks from the second web browser or the remote list of bookmarks to reflect the latest version of bookmarks, wherein the synchronized local list of bookmarks of the second web browser is a different list as the local list of bookmarks of the first web browser, wherein the communication received from the first web browser uses a first network protocol and the communication received from the second web browser uses a second network protocol, and wherein the first network protocol and the second network protocols are different network protocols.

12. The computer-readable storage medium of claim 9 wherein the method further comprises configuring the remote list of bookmarks stored in the bookmark database to be editable by the user via the server computer system.

13. A non-transitory computer-readable storage medium, having instructions stored therein, which when executed, cause a server computer system to perform a method comprising:
receiving communications at the server computer system from a plurality of web browsers associated with a same user, wherein at least two of the plurality of web browsers are different types of web browsers, and wherein the at least two of the plurality of web browsers communicate with the server using different network protocols;
collecting local lists of bookmarks from the plurality of web browsers;
comparing the local lists of bookmarks with a remote list of bookmarks stored in a bookmark database associated with the server computer system;
synchronizing the local lists of bookmarks with the remote list of bookmarks, wherein at least two of the synchronized local lists of bookmarks of the plurality of web browsers are different lists, wherein said synchronizing comprises adding or deleting one or more bookmarks to or from at least one of the local lists of bookmarks or the remote list of bookmarks to reflect the latest version of bookmarks; and
partitioning the remote list of bookmarks stored in the bookmark database,
wherein the partitioned list of bookmarks comprises a plurality of sublists of bookmarks, each of the plurality of sublists associated with a corresponding one of the plurality of web browsers of the same user.

14. A non-transitory computer-readable storage medium, having instructions stored therein, which when executed, cause a client computer system to perform a method comprising:
automatically communicating with a server upon a launch of a web browser of the client computer system of a user to synchronize a local list of bookmarks of the web browser with a remote list of bookmarks stored in a bookmark database associated with the server, wherein the local list is associated with the client computer system, wherein said automatically communicating comprises sending a request to the server to retrieve the remote list of bookmarks upon the launch of the web browser;
receiving the remote list of bookmarks stored in the bookmark database from the server in response to the request;
upon launch of the web browser, automatically checking whether the local list of bookmarks and the remote list of bookmarks are synchronized, wherein said automatically checking comprises comparing the local list of bookmarks of the web browser with the remote list of bookmarks associated with the client computer system stored in the bookmark database; and
when the local list of bookmarks and the remote list of bookmarks are not synchronized, synchronizing the local list of bookmarks from the web browser with the remote list of bookmarks associated with the client computer system stored in the bookmark database, wherein said synchronizing comprises adding or deleting one or more bookmarks to or from at least one of the local list of bookmarks or the remote list of bookmarks to reflect the latest version of bookmarks, wherein the local list of bookmarks of the web browser is accessible by the user of the client computer system while the client computer system is off-line, wherein synchronizing further comprises synchronizing the local list of bookmarks of the web browser of the client with a corresponding one of a plurality of sublists of bookmarks stored in the bookmark database, each of the plurality of sublists associated with at least one of a corresponding one of a plurality of web browsers of the same user or a corresponding client of the same user.

15. The computer-readable storage medium of claim 14 wherein the method further comprises authenticating the user of the client computer system with the server.

16. The computer-readable storage medium of claim 14 wherein the method further comprises accessing the server to edit the remote list of bookmarks stored in the bookmark database.

17. A server comprising:
a processing device configured to execute a bookmark synchronizer;
a storage device coupled to the processor, the storage device to store a bookmark database;
wherein the bookmark synchronizer configured to receive a communication from a first web browser of a first client of a user to synchronize a local list of bookmarks of the first web browser with a remote list of bookmarks stored in the bookmark database, wherein the local list is associated with the first client, wherein the first web browser of the first client automatically sends the communication to the server to synchronize the local list of bookmarks with the remote list of bookmarks, wherein the bookmark synchronizer is further configured to automatically check whether the local list of bookmarks and the remote list of bookmarks are synchronized upon receiving the communication to synchronize, wherein the bookmark synchronizer is further configured to collect the local list of bookmarks from the first web browser and to compare the local list of bookmarks with the remote list of bookmarks associated with the first client stored in the bookmark database when automatically checking, and, when the local list of bookmarks and the remote list of bookmarks are not synchronized, the bookmark synchronizer is further configured to synchronize the local list of bookmarks from the first web browser with the remote list of bookmarks associated with the first client stored in the bookmark database, wherein the bookmark synchronizer is configured to synchronize the lists by adding or deleting one or more bookmarks to or from at least one of the local list of bookmarks or the remote list of bookmarks to reflect the latest version of bookmarks, wherein the local list of bookmarks of the first web browser is accessible by the user of the first client while the first client is off-line, wherein the bookmark synchronizer is further configured to partition the remote list of bookmarks stored in the bookmark database, wherein the partitioned list of bookmarks comprises a plurality of sublists of bookmarks, each of the plurality of sublists associated with at least one of a corresponding client of the same user or a corresponding web browser of the same user.

18. A client comprising:
a processing device configured to execute a web browser and a bookmark plug-in communicatively coupled to the web browser; and
a storage device coupled to the processing device;
wherein the bookmark plug-in is configured to automatically communicate with a server upon a launch of the web browser of the client of a user to synchronize a local list of bookmarks of the web browser with a remote list of bookmarks stored in a bookmark database associated with the server by sending a request to the server to retrieve the remote list of bookmarks upon the launch of the web browser, wherein the local list is associated with the client, wherein the bookmark plug-in is further configured to receive the remote list of bookmarks stored in the bookmark database from the server in response to the request, wherein, upon launch of the web browser, the bookmark plug-in is further configured to automatically check whether the local list of bookmarks and the remote list of bookmarks are synchronized by comparing the local list of bookmarks of the web browser with the remote list of bookmarks associated with the client stored in the bookmark database, and wherein, when the local list of bookmarks and the remote list of bookmarks are not synchronized, the bookmark plug-in is further configured to synchronize the local list of bookmarks from the first web browser with the remote list of bookmarks associated with the first client stored in the bookmark database, wherein the bookmark plug-in is configured to synchronize the lists by adding or deleting one or more bookmarks to or from at least one of the local list of bookmarks or the remote list of bookmarks to reflect the latest version of bookmarks, wherein the local list of bookmarks of the first web browser is accessible by the user of the client while the first client is off-line, wherein the bookmark plug-in is further configured to synchronize the local list of bookmarks of the web browser of the client with a corresponding one of a plurality of sublists of bookmarks stored in the bookmark database, each of the plurality of sublists associated with a corresponding client of the same user.

19. A server comprising:
a processing device configured to execute a bookmark synchronizer;
a storage device coupled to the processor, the storage device to store a bookmark database;
wherein the bookmark synchronizer configured to receive communications from a plurality of web browsers associated with a same user, wherein at least two of the plurality of web browsers are different types of web browsers, wherein the at least two of the plurality of web browsers communicate with the server using different network protocols, wherein the bookmark synchronizer is further configured to collect local lists of bookmarks from the plurality of web browsers, to compare the local lists of bookmarks with a remote list of bookmarks stored in the bookmark database, and to synchronize the local lists of bookmarks with the remote list of bookmarks, wherein at least two of the synchronized local lists of bookmarks of the plurality of web browsers are different lists, wherein the bookmark synchronizer is configured to synchronize the lists by adding or deleting one or more bookmarks to or from at least one of the local lists of bookmarks or the remote list of bookmarks to reflect the latest version of bookmarks.

20. The server of claim 19, wherein the bookmark synchronizer is further configured to partition the remote list of bookmarks stored in the bookmark database, wherein the partitioned list of bookmarks comprises a plurality of sublists of bookmarks, each of the plurality of sublists associated with a corresponding one of the plurality of web browsers of the same user.

* * * * *